(12) United States Patent
Shim

(10) Patent No.: US 9,653,928 B2
(45) Date of Patent: May 16, 2017

(54) BATTERY PACK INCLUDING SENSING BOARD AND POWER STORAGE SYSTEM EMPLOYING THE SAME

(71) Applicant: SAMSUNG SDI CO., LTD., Yongin-si, Gyeonggi-do (KR)

(72) Inventor: Kyung-Sub Shim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 14/039,701

(22) Filed: Sep. 27, 2013

(65) Prior Publication Data

US 2014/0028245 A1  Jan. 30, 2014

Related U.S. Application Data

(63) Continuation of application No. 12/805,524, filed on Aug. 4, 2010, now Pat. No. 8,569,998.

(30) Foreign Application Priority Data

Jan. 18, 2010  (KR) ........................ 10-2010-0004479

(51) Int. Cl.
*H02J 7/00*  (2006.01)
*H02J 1/16*  (2006.01)
*H02J 3/32*  (2006.01)
*H01M 10/48*  (2006.01)

(52) U.S. Cl.
CPC ......... *H02J 7/0004* (2013.01); *H01M 10/482* (2013.01); *Y10T 307/62* (2015.04)

(58) Field of Classification Search
CPC .................................................. H02J 7/00134

USPC ............ 320/101, 112, 134, 138; 307/43–48, 307/64–68
See application file for complete search history.

(56) References Cited

U.S. PATENT DOCUMENTS

| 5,422,558 A | 6/1995 | Stewart |
| 6,184,656 B1 | 2/2001 | Karunasiri et al. |
| 6,841,291 B2 | 1/2005 | Minamiura |
| 7,304,453 B2 | 12/2007 | Eaves |
| 7,400,113 B2 | 7/2008 | Osborne |
| 7,548,821 B2 | 6/2009 | Tae et al. |
| 7,772,799 B2 * | 8/2010 | Wu ............................. 320/104 |
| 7,843,169 B1 * | 11/2010 | Tsukamoto et al. .......... 320/117 |
| 2005/0077874 A1 | 4/2005 | Nakao |

(Continued)

FOREIGN PATENT DOCUMENTS

| KR | 10-2007-0043149 A | 4/2007 |
| KR | 10-2007-0095612 A | 10/2007 |

(Continued)

OTHER PUBLICATIONS

Office Action dated Jul. 29, 2011, from corresponding Korean Application KR 10-2010-0004479.

(Continued)

*Primary Examiner* — Richard V Muralidar
(74) *Attorney, Agent, or Firm* — Lee & Morse, P.C.

(57) ABSTRACT

A battery pack includes a battery unit including rechargeable batteries, a sensing board, the sensing board configured to process status information detected from the batteries, and a harness wire, the harness wire connecting the batteries and the sensing board so that the status information can be transmitted to the sensing board.

19 Claims, 3 Drawing Sheets

(56) References Cited

U.S. PATENT DOCUMENTS

| | | |
|---|---|---|
| 2007/0090798 A1 | 4/2007 | Yun et al. |
| 2008/0143297 A1 | 6/2008 | Lafleur et al. |
| 2009/0305116 A1 | 12/2009 | Yang et al. |
| 2012/0059527 A1 | 3/2012 | Beaston et al. |

FOREIGN PATENT DOCUMENTS

| | | |
|---|---|---|
| KR | 10-2007-0103897 A | 10/2007 |
| KR | 10-0814883 B1 | 3/2008 |
| KR | 10-0896131 B1 | 4/2009 |
| KR | 10-2009-0046474 A | 5/2009 |
| KR | 10-2010-0097504 A | 9/2010 |

OTHER PUBLICATIONS

Notice of Allowance dated Nov. 21, 2011 from corresponding Korean Application KR 10-2010 0004479.

\* cited by examiner

BATTERY PACK INCLUDING SENSING BOARD AND POWER STORAGE SYSTEM EMPLOYING THE SAME

CROSS REFERENCE TO RELATED APPLICATION

This is a continuation application based on pending application Ser. No. 12/805,524 filed Aug. 4, 2010, the entire contents of which is hereby incorporated by reference.

BACKGROUND

1. Field

Embodiments relate to a battery pack including a sensing board and a power storage system employing the same.

2. Description of the Related Art

A battery pack is an electrical storage device fabricated by connecting a plurality of batteries, and may be used as a storage device of a power storage system, which stores power in each of the batteries and provides the power if necessary, for example.

SUMMARY

It is a feature of an embodiment to provide a battery pack including a sensing board, and a power storage system including the same.

It is another feature of an embodiment to provide an electrical storage device that includes a battery management system (BMS) for monitoring and controlling the status, e.g., of voltage, current, temperature, and the like, for smooth operation of the battery packs.

At least one of the above and other features and advantages may be realized by providing a battery pack including a battery unit including rechargeable batteries, a sensing board, the sensing board configured to process status information detected from the batteries, and a harness wire, the harness wire connecting the batteries and the sensing board for transmitting the status information to the sensing board.

The battery pack may have integrated therein the battery unit, the sensing board, and the harness wire.

The sensing board may be configured to perform analog/digital conversion of the status information and transmit the converted digital signal to a control unit.

The sensing board may be configured to process status information that includes information regarding one or more of voltage, current, and temperature of the battery pack.

The sensing board may be configured to process status information that includes information regarding one or more of voltage, current, and temperature of respective batteries of the battery pack.

The batteries may include nickel-cadmium batteries, lead acid batteries, nickel metal hydride batteries, lithium ion batteries, lithium polymer batteries, or a combination thereof.

At least one of the above and other features and advantages may also be realized by providing a power storage system including a battery pack, the battery pack including a battery unit including rechargeable batteries, a sensing board configured to process status information detected from the batteries, and a harness wire, the harness wire connecting the batteries and the sensing board for transmitting the status information to the sensing board, a battery management system (BMS) for controlling the status of the battery pack, and a power management system (PMS) for controlling overall power supply among the battery pack and peripheral devices.

The battery pack may have integrated therein the battery unit, the sensing board, and the harness wire.

The sensing board may be configured to perform analog/digital conversion of the status information and transmit the converted digital signal to the BMS.

The BMS may be configured to transmit the status information to the PMS, and to control charging and discharging of the battery unit.

The sensing board may be configured to process status information that includes information regarding one or more of voltage, current, and temperature of the battery pack.

The sensing board may be configured to process status information that includes information regarding one or more of voltage, current, and temperature of respective batteries of the battery pack.

The batteries may include nickel-cadmium batteries, lead acid batteries, nickel metal hydride batteries, lithium ion batteries, lithium polymer batteries, or a combination thereof.

The peripheral devices may include a power generating system for generating power, and the PMS may be configured to receive power from the power generating system.

The power generating system may includes one or more of a photovoltaic system, a wind power generating system, and a tidal power generating system.

The peripheral devices may include a commercial grid, and the PMS may be configured to receive commercial power from the commercial grid.

The commercial grid may include power plants, substations, and power lines.

The peripheral devices may include a load for consuming power provided by the PMS, and the PMS may be configured to provide power to the load.

The load may include a household or a commercial facility.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
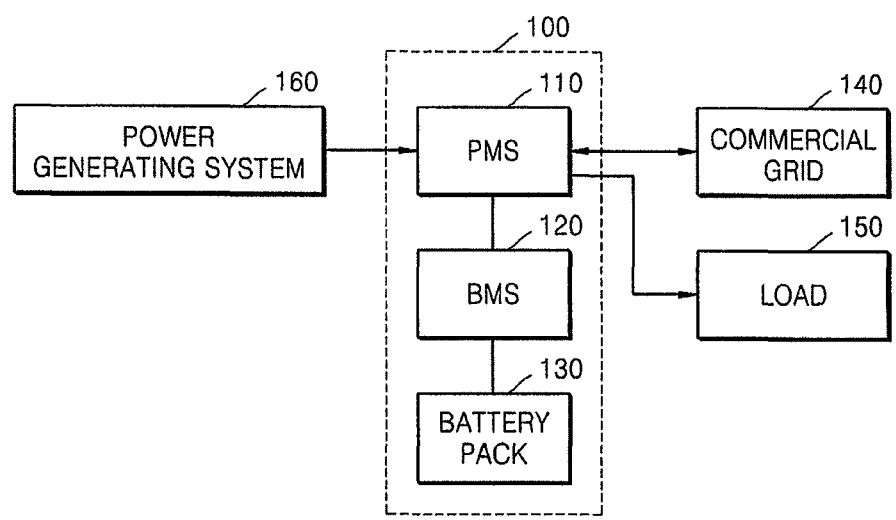
FIG. 1 illustrates a diagram of an example structure in which a power storage system according to an embodiment and peripheral devices are connected to one another.

Korean Patent Application No. 10-2010-0004479, filed on Jan. 18, 2010, in the Korean Intellectual Property Office, and entitled: "Battery Pack Including Sensing Board and Power Storage System Employing the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

FIG. 1 illustrates a diagram of an example structure in which a power storage system 100 employing a battery pack 130 according to an embodiment and peripheral devices are connected to one another.

In the example embodiment shown in FIG. 1, the power storage system 100 includes a power management system (PMS) 110, a battery management system (BMS) 120, and the battery pack 130.

The power storage system 100 may be connected to one or more of a power generating system 160, a commercial grid 140, and a load 150. The power generating system 160 may be, e.g., a system that generates power that fluctuates according to external conditions, such as a photovoltaic system, a wind power generating system, or a tidal power generating system, and may also include any of various renewable power generating systems such as a solar power generating system, a geothermal power generating system, and the like. A solar battery, which generates electric energy by using sunlight, may be easily installed at a household or a commercial facility such as a store, shopping center, factory, etc., and thus may be suitably applied to a power storage system.

In the example embodiment shown in FIG. 1, the PMS 110 controls overall power supply. For example, the PMS 110 may receive power generated by the power generating system 160 and transmit the power to the commercial grid 140, store the power in the battery pack 130, or provide the power to the load 150. Furthermore, the PMS 110 may transmit power stored in the battery pack 130 to the commercial grid 140, may provide power stored in the battery pack 130 to the load 150, and may store power provided by the commercial grid 140 in the battery pack 130. Furthermore, in the case of abnormal situations, e.g., power interruption in the commercial grid 140, the PMS 110 may function as an uninterruptible power supply (UPS) and provide power to the load 150. Even when the commercial grid 140 operates normally, the PMS 110 may provide power, either generated by the power generating system 160 or stored in the battery pack 130, to the load 150.

In the example embodiment shown in FIG. 1, the PMS 110 performs power conversion for storing generated power in the battery pack 130, for providing generated power to the commercial grid 140 or the load 150, for storing power from the commercial grid 140 in the battery pack 130, and for providing power stored in the battery pack 130 to the commercial grid 140 or the load 150. For example, the PMS 110 may convert DC voltage from the battery pack 130 to AC voltage when the PMS 110 provides power to the load 150. Furthermore, the PMS 110 may monitor the status (e.g., voltage, current, and/or temperature, described below) of the battery pack 130, the commercial grid 140, and the load 150, and may distribute power generated by the power generating system 160. The PMS 110 may distribute power provided by the commercial grid 140, and may distribute power stored in the battery pack 130.

Before describing the BMS 120 and the battery pack 130, peripheral devices connected to the power storage system 100 will be described. The peripheral devices may include, e.g., the power generating system 160 that generates power, the commercial grid 140, and/or the load 150 that consumes power.

The power generating system 160 may generate electric energy and output the generated electric energy to the PMS 110.

The commercial grid 140 may include power plants, substations, and power lines. In an example implementation, during normal operations the commercial grid 140 provides power to the battery pack 130 and/or the load 150, and receives power from the power generating system 160 and/or the battery pack 130. When the commercial grid 140 operates abnormally, e.g., due to power interruption or an abnormal operation due to electric work, power provided by the commercial grid 140 to the battery pack 130 or the load 150 is ceased. Power provided to the commercial grid 140 by the power generating system 160 or the battery pack 130 may also cease.

In an example implementation, the load 150 consumes power generated by the power generating system 160, power stored in the battery pack 130, or power provided by the commercial grid 140. The load may be, or may include, e.g., a household, a factory, etc.

Detailed descriptions of the BMS 120 and the battery pack 130 of the power storage system 100 will be given below with reference to FIG. 2, which illustrates a diagram of an example power storage system shown in FIG. 1 according to an embodiment.

Figure 2:
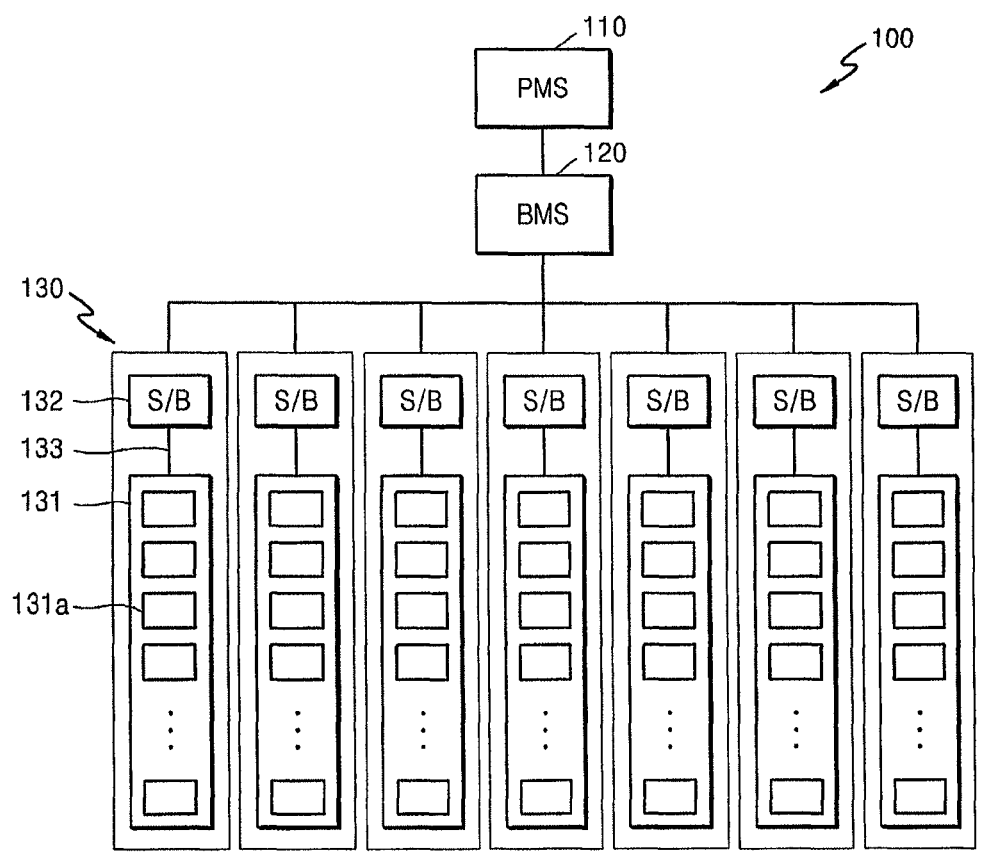
FIG. 2 illustrates a diagram of an example power storage system shown in FIG. 1 according to an embodiment.

In the example embodiment shown in FIG. 2, the BMS 120 is connected to the battery pack 130 and controls charging and discharging of the battery pack 130 under the control of the PMS 110. Power discharged from the battery pack 130 and power charged to the battery pack 130 are transmitted via the BMS 120. The BMS 120 may perform overcharging protection, overdischarging protection, overcurrent protection, overheat protection, cell balancing, and the like to protect the battery pack 130. The BMS 120 may monitor the remaining power and lifespan of the battery pack 130 by receiving one or more inputs of status information regarding, e.g., the voltage, current, and temperature, of a battery unit 131 from a harness wire 133 and a sensing board 132 that are described below.

In the example described above, the BMS 120 transmits status information of the battery unit 131 to the PMS 110, and controls charging or discharging of the battery pack 130 under the control of the PMS 110. Furthermore, the battery pack 130 stores power provided under the control of the PMS 110.

The provided power may be power converted from power generated by the power generating system 160 or power converted from power provided by the commercial grid 140. Power stored in the battery pack 130 may be provided to the commercial grid 140 or the load 150 under the control of the PMS 110.

In the example embodiment shown in FIG. 2, the battery pack 130 includes the battery unit 131, which includes a plurality of batteries 131a that may be rechargeable, the harness wires 133, which are lines for transmitting information signals regarding the status of the battery unit 131, and the sensing boards 132, which transmit signals received via the harness wires 133 to the BMS 120. A single battery pack 130 may be used, or, to embody a larger capacity, a plurality of the battery packs 130 may be connected in series or in parallel as shown in FIG. 2.

The batteries 131a may be, e.g., nickel-cadmium (Ni—Cd) batteries, lead acid batteries, nickel metal hydride (NiMH) batteries, lithium ion batteries, lithium polymer batteries, etc., or a combination thereof.

In the example embodiment shown in FIG. 2, the harness wires 133 form signal transmission lines for transmitting information signals regarding the statuses of one or more battery packs, and/or each of the batteries 131a of the battery unit 131, to the sensing boards 132. The statuses may be, e.g., voltages, currents, and temperatures, etc. When the information signals are provided by detectors such as sensors (not shown) at first ends of the harness wires 133, the information signals are transmitted to the sensing boards 132 via the harness wires 133 as analog signals. The sensors may be, e.g., terminals that are disposed at the first ends of the harness wires 133 and are connected to electrodes of each of the batteries 131a to detect currents. The sensors may be, e.g., thermistors that are disposed at the first ends of the harness wires 133 to detect temperatures. Any of various types of sensors may be connected to the harness wires 133 to detect desired analog values. Analog signals input via the harness wires 133 are converted to digital signals (analog/digital conversion) by the sensing boards 132, and the converted digital signals are transmitted, e.g., to a superordinate control unit such as BMS 120, to be used as data for controlling the battery pack 130.

As described above, a battery pack 130 may have harness wires 133 for transmitting signals from the battery pack 130 and/or each of batteries 131a to sensing boards 132, in which the lengths of the harness wires 133 are reduced. This may eliminate signal errors in analog signals resulting from an increase of electrical resistance in longer wires, and may minimize costs associated with increasing capacity of the battery pack 130. Since both the battery unit 131 and the sensing boards 132, which are connected by the harness wires 133, may be integrated in the battery pack 130, the lengths of the harness wire 133 may be made significantly shorter than the lengths of harness wires in a comparative structure wherein sensing boards are installed within the BMS.

In a general comparative structure (not shown), each of the battery packs includes a harness wire as a line for transmitting information signals regarding the status of each of the batteries, and a sensing board interposed between the BMS and the harness wires to convert analog signals transmitted from each of the batteries via the harness wires into digital signals and to transmit the digital signals to the BMS. However, since the sensing board is disposed outside of the battery pack, significant lengths of harness wires are required for connecting each of the batteries to the sensing board. When the length of a harness wire is increased, electrical resistance also increases. Thus, information signals provided by sensors may lose accuracy or be completely erroneous. As a result, it may be difficult for the BMS to exert precise control. Furthermore, where the sensing board is disposed outside the battery pack and integrated in the BMS, it is necessary to increase the number of both sensing boards and BMS's when the battery capacity is increased, increasing costs.

Figure 3:
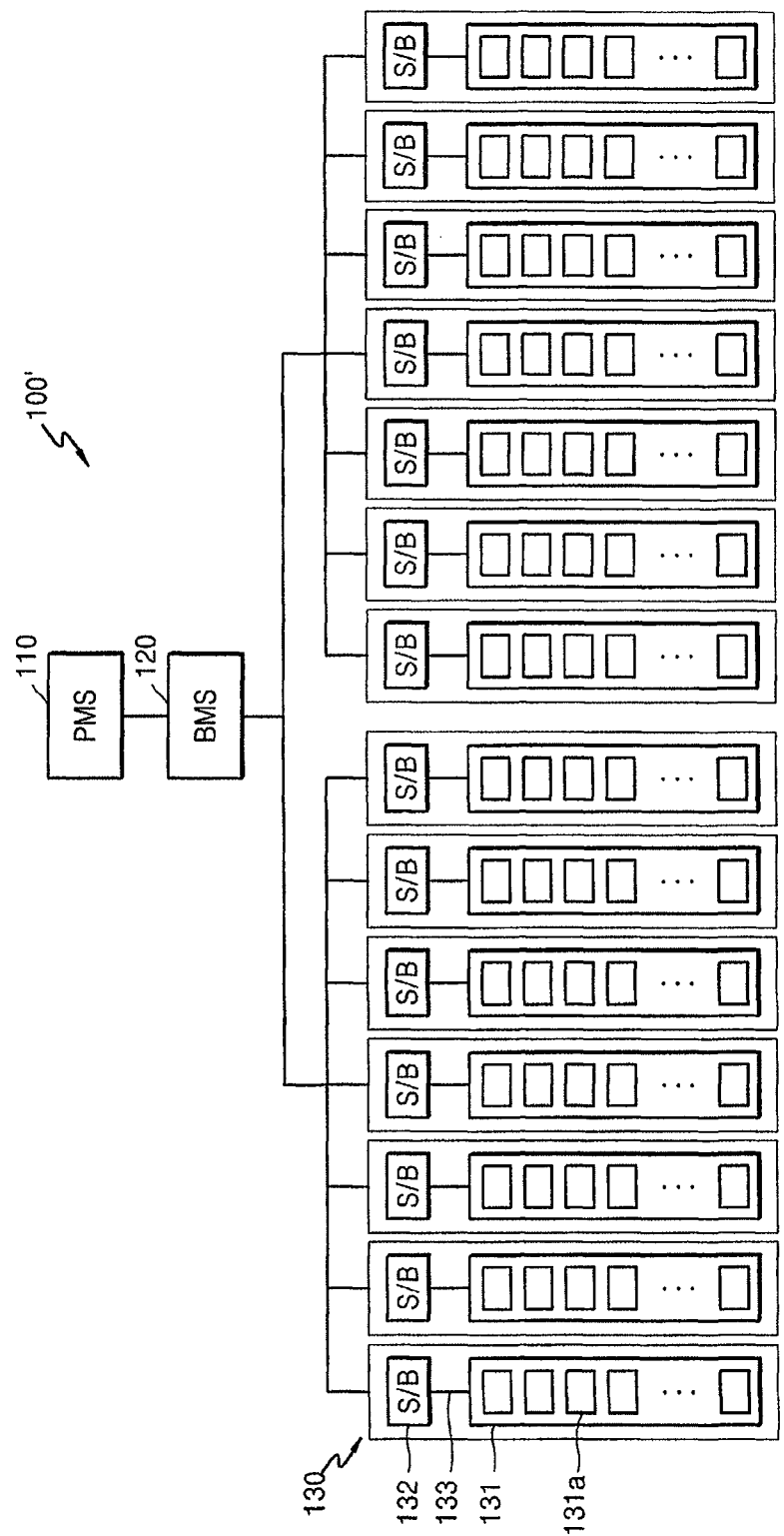
FIG. 3 illustrates a diagram of a modified example of the power storage system shown in FIG. 2.

In contrast, where the sensing boards 132 are in the battery pack 130 as described above, the storage capacity of the power storage system 100 may be increased easily. For example, it is assumed that the storage capacity of a system 100 including seven battery packs as shown in FIG. 2 is increased by increasing the number of battery packs to fourteen in a system 100' shown in FIG. 3. In a comparative case, where a sensing board is integrated in a BMS, it is necessary to increase the number of sensing boards as well as increasing the number of battery packs, and thus it is also necessary to add BMS's in which the sensing boards are integrated. Therefore, both the number of sensing boards and the number of BMS's increase at the same time, and thus the overall cost significantly increases. However, where the sensing boards 132 are integrated in the battery packs 130 as in the present embodiment, the number of sensing boards 132 may increase as the number of battery packs 130 increases, but it is not necessary to increase the number of the BMS 120. Therefore, it may be less expensive to increase the storage capacity of the power storage system 100 according to an embodiment than in the case of the comparative structure.

As described above, embodiments may provide a battery pack in which a plurality of batteries are connected to one another, and a power storage device employing the same. The battery pack according to an embodiment may have a sensing board integrated in the battery pack, such that signals may be transmitted to the BMS more precisely due to reduced electrical resistance resulting from a significant reduction of the length of the harness wire. Furthermore, it may be less expensive to increase storage capacity of the power storage system.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An energy storage system, comprising:
   at least one battery pack, the at least one battery pack including:
      a battery unit including a plurality of rechargeable batteries, and
      a sensing board to process status information detected from the plurality of rechargeable batteries, the sensing board coupled to the battery unit; and
      a harness wire, connected between the battery unit and the sensing board, for transmitting the status information; and
   a battery management system (BMS), located outside of the at least one battery pack, for receiving the status information from the sensing board to control the at least one battery pack, wherein the harness wire is connected between the rechargeable batteries in the battery unit and the sensing board and wherein the harness wire is not directly connected to the sensing board of another battery pack and is located entirely within the at least one battery pack.

2. The energy storage system as claimed in claim 1, wherein the battery pack has integrated therein the plurality of rechargeable batteries, the sensing board, and the harness wire.

3. The energy storage system as claimed in claim 2, wherein the sensing board is to perform analog/digital conversion of the status information to generate a converted digital signal, and transmit the converted digital signal to a control unit.

4. The energy storage system as claimed in claim 2, wherein the sensing board is to process status information that includes information regarding one or more of voltage, current, or temperature of the battery pack.

5. The energy storage system as claimed in claim 4, wherein the sensing board is to process status information that includes information regarding one or more of voltage, current, or temperature of respective rechargeable batteries of the battery pack.

6. The energy storage system as claimed in claim 1, wherein the rechargeable batteries include at least one of nickel-cadmium batteries, lead acid batteries, nickel metal hydride batteries, lithium ion batteries, lithium polymer batteries, or a combination thereof.

7. The energy storage system as claimed in claim 1, further comprising a power management system (PMS) to control overall power supply among the battery pack and peripheral devices.

8. The energy storage system as claimed in claim 7, wherein the battery pack has integrated therein the plurality of rechargeable batteries, the sensing board, and the harness wire.

9. The energy storage system as claimed in claim 8, wherein the sensing board is to perform analog/digital conversion of the status information to generate a converted digital signal, and transmit the converted digital signal to the BMS.

10. The energy storage system as claimed in claim 9, wherein the BMS is to transmit the status information to the PMS, and to control charging and discharging of the plurality of rechargeable batteries.

11. The energy storage system as claimed in claim 8, wherein the sensing board is to process status information that includes information regarding one or more of voltage, current, or temperature of the battery pack.

12. The energy storage system as claimed in claim 11, wherein the sensing board is to process status information that includes information regarding one or more of voltage, current, or temperature of respective rechargeable batteries of the battery pack.

13. The energy storage system as claimed in claim 7, wherein the rechargeable batteries include at least one of nickel-cadmium batteries, lead acid batteries, nickel metal hydride batteries, lithium ion batteries, lithium polymer batteries, or a combination thereof.

14. The energy storage system as claimed in claim 7, wherein: the peripheral devices include a power generating system to generate power, and the PMS is to receive power from the power generating system.

15. The energy storage system as claimed in claim 14, wherein the power generating system includes one or more of a photovoltaic system, a wind power generating system, or a tidal power generating system.

16. The energy storage system as claimed in claim 14, wherein: the peripheral devices include a commercial grid, and the PMS is to receive commercial power from the commercial grid.

17. The energy storage system as claimed in claim 16, wherein the commercial grid includes power plants, substations, and power lines.

18. The energy storage system as claimed in claim 16, wherein: the peripheral devices include a load for consuming power provided by the PMS, and the PMS is to provide power to the load.

19. The energy storage system as claimed in claim 18, wherein the load includes a household or a commercial facility.

* * * * *